US010404781B2

(12) United States Patent
Reddy et al.

(10) Patent No.: US 10,404,781 B2
(45) Date of Patent: Sep. 3, 2019

(54) FLOW CHARACTERISTIC BASED PEER-TO-PEER SYSTEM

(71) Applicant: Cisco Technology, Inc., San Jose, CA (US)

(72) Inventors: Tirumaleswar Reddy, Bangalore (IN); Daniel Wing, San Jose, CA (US); Bill Ver Steeg, New Smyrna Beach, FL (US)

(73) Assignee: Cisco Technology, Inc., San Jose, CA (US)

( * ) Notice: Subject to any disclaimer, the term of this patent is extended or adjusted under 35 U.S.C. 154(b) by 488 days.

(21) Appl. No.: 14/636,208

(22) Filed: Mar. 3, 2015

(65) Prior Publication Data

US 2016/0205171 A1 Jul. 14, 2016

(30) Foreign Application Priority Data

Jan. 14, 2015 (IN) ............................ 215/CHE/2015

(51) Int. Cl.
*G06F 15/16* (2006.01)
*H04L 29/08* (2006.01)

(52) U.S. Cl.
CPC ............ *H04L 67/06* (2013.01); *H04L 67/104* (2013.01); *H04L 67/1085* (2013.01)

(58) Field of Classification Search
CPC .................................................. H04L 43/0876
See application file for complete search history.

(56) References Cited

U.S. PATENT DOCUMENTS 7,379,967 B2 * 5/2008 Izutsu .................. H04L 67/104 709/204
8,005,975 B2 * 8/2011 Liu ........................ G06F 15/16 709/231
8,606,846 B2 * 12/2013 Czechowski, III ... H04L 67/104 709/201

(Continued)

FOREIGN PATENT DOCUMENTS

JP 2007087280 4/2007
WO 2012/115616 8/2012
WO 2014/095274 6/2014

OTHER PUBLICATIONS

Bakker et al., Peer-to-Peer Streaming Peer Protocol (PPSPP), Internet Engineering Task Force (IETF), ISSN: 2070-1721.*

(Continued)

*Primary Examiner* — Brian Whipple
*Assistant Examiner* — Tesfu N Mekonen
(74) *Attorney, Agent, or Firm* — Merchant & Gould P.C.

(57) ABSTRACT

In one embodiment, there is provided a device implementing a leecher peer, the device including a processor to request a list of seeder peers from a tracker, receive the list, select a first seeder peer from the list from which to download at least part of a content item, start downloading the at least part of the content item from the first seeder peer, receive a message from the first seeder peer indicating a deterioration in an upload flow characteristic of the first seeder peer, in response to receiving the message, request an updated list of seeder peers, receive the updated list, select a second one of the seeder peers from the updated list from which to download another part of the content item, cease downloading the content item from the first seeder peer, and start downloading the other part of the content item from the second seeder peer.

20 Claims, 7 Drawing Sheets

(56) References Cited

U.S. PATENT DOCUMENTS

| | | | | |
|---|---|---|---|---|
| 9,003,467 | B2 * | 4/2015 | Damola | H04N 7/165 725/116 |
| 9,313,268 | B2 * | 4/2016 | Souza | H04L 65/80 |
| 9,374,420 | B2 * | 6/2016 | Burba | H04L 67/1063 |
| 9,386,093 | B2 * | 7/2016 | Hilt | H04L 67/1063 |
| 9,571,571 | B2 * | 2/2017 | Cohen | H04L 67/104 |
| 9,591,070 | B2 * | 3/2017 | El-Beltagy | H04L 67/1046 |
| 2009/0305778 | A1 * | 12/2009 | Yu | A63F 13/10 463/29 |
| 2011/0252151 | A1 | 10/2011 | Lu et al. | |
| 2013/0007218 | A1 | 1/2013 | Shah et al. | |
| 2014/0280563 | A1 * | 9/2014 | El-Beltagy | H04L 67/1068 709/204 |
| 2014/0337470 | A1 * | 11/2014 | Koka | G06F 21/10 709/217 |
| 2015/0326657 | A1 * | 11/2015 | Cohen | H04L 29/08333 709/231 |

OTHER PUBLICATIONS

Eckel, Charles, “Application Enabled Open Networking (AEON)”, Jun. 25-26, 2014, Berlin, Germany.

Penno, R. et al, “Application Enabled SDN (A-SDN) draft-penno-pcp-asdn-00”, Network Working Group Internet Draft, Sep. 29, 2013.

Wing, D. et al , “PCP Flowdata Option draft-wing-pcp-flowdata-00”, PCP Working Group Internet Draft, Jul. 3, 2013.

Bakker, A. et al, “Peer-To-Peer Streaming Peer Protocol (PPSPP) draft-IETF-PPSP-Peer-Protocol-12”, Nov. 28, 2014.

Bakker, A. et al, “Peer-To-Peer Streaming Peer Protocol (PSPP) draft-IETF-PPSP-Peer-Protocol-10”, Jun. 17, 2014.

Cruz, Rui S. et al, “PPSP Tracker Protocol-Base Protocol (PPAS-TP/1.0) draft-ietf-ppsp-base-tracker-protocol-03”, Dec. 31, 2013.

Zhang, Y. et al, “Problem Statement and Requirements of the Peer-To-Peer Streaming Protocol (PPSP)”, Internet Engineering Task Force (IETF), Jul. 1, 2013.

* cited by examiner

FLOW CHARACTERISTIC BASED PEER-TO-PEER SYSTEM

RELATED APPLICATION INFORMATION

The present application claims priority from Indian Patent Application S/N 215/CHE/2015 of Cisco Technologies Inc. filed 14 Jan. 2015.

TECHNICAL FIELD

The present disclosure generally relates to flow characteristic based peer-to-peer systems.

BACKGROUND

Streaming traffic is among the largest and fastest growing traffic on the Internet. Peer-to-Peer (P2P) streaming contributes substantially to this growth. The Peer-to-Peer Streaming Peer Protocol (PPSPP) (//tools.ietf.org/html/draft-ietf-ppsp-peer-protocol-10) is a protocol for disseminating the same content to a group of interested parties in a streaming fashion. PPSPP supports streaming of both pre-recorded (on-demand) and live audio/video content. The Peer-to-Peer Streaming Protocol (PPSP) architecture requires PPSP peers to communicate with the tracker using PPSP Tracker Protocol-Base Protocol (//tools.ietf.org/html/draft-ietf-ppsp-base-tracker-protocol-03) in order to participate in a particular streaming content swarm. The tracker could be provided by the content provider.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention, a device implementing a leecher peer, the device including a processor, and a memory to store data used by the processor, wherein the processor is operative to request a list of seeder peers from a peer-to-peer tracker, receive the list of seeder peers from the peer-to-peer tracker, the list being based on the upload flow characteristic of each of the seeder peers, select a first one of the seeder peers from the list of seeder peers from which to download at least part of a content item, start downloading the at least part of the content item from the first seeder peer, receive a first message from the first seeder peer indicating a deterioration in the upload flow characteristic of the first seeder peer, in response to receiving the first message, request an updated list of seeder peers from the peer-to-peer tracker, receive the updated list of seeder peers from the peer-to-peer tracker, select a second one of the seeder peers from the updated list of seeder peers from which to download another part of the content item, cease downloading the content item from the first seeder peer, and start downloading the other part of the content item from the second seeder peer.

Description Continued

By way of introduction, peers serving content have different upstream bandwidth capabilities, and those capabilities change over time. Although heuristics such as recent transfer speed are useful, that information considers congestion anywhere along that path (i.e. upload access link, Internet path and download access link). Therefore, when a peer wants to fetch content and N number of peers (or seeders) in the swarm can serve that content, the peer typically uses a trail-and-error mechanism to find a peer in a peer-list that can serve that content (or chunks) at the desired bit-rate without frame freezes. Downloading content from remote peers may involve many processes, for example but not limited to, ICE connectivity checks, nomination of candidates (see //tools.ietf.org/html/rfc5245), PPSP HANDSHAKE, HAVE messages etc. (as defined by PPSP, see //tools.ietf.org/html/draft-ietf-ppsp-peer-protocol-10). Therefore, probing all peers in the peer list may be time consuming and inefficient. Additionally, if the peer encounters frame freezes fetching the current chunk, then the peer can try fetching a lower bit-rate chunk and if the next chunk in a different format is unavailable in the seeder then the peer may again have to find another seeder in the peer-list which has a lower bit-rate chunk. This repeated search and establishing connections with remote peers could result in unacceptable quality degradation and impact user experience.

Figure 1:
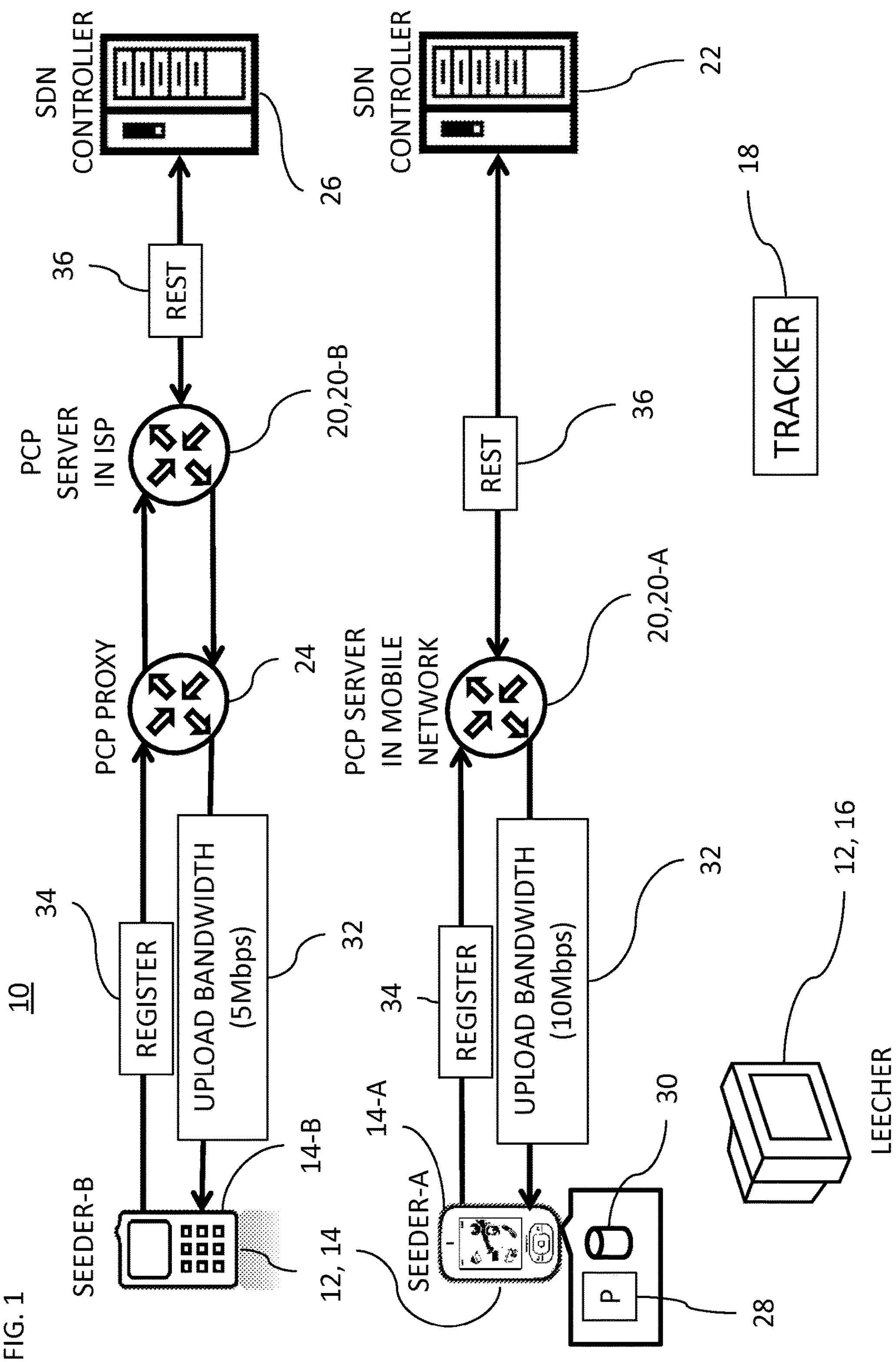
FIG. 1 is a partly pictorial, partly block diagram view of a peer-to-peer system constructed and operative in accordance with an embodiment of the present invention.

Reference is now made to FIG. 1, which is a partly pictorial, partly block diagram view of a peer-to-peer system 10 constructed and operative in accordance with an embodiment of the present invention.

The peer-to-peer system 10 includes a plurality of peers 12. The peers 12 may be seeder peers 14 and/or leecher peers 16. Any peer 12 may be: a seeder peer 14; or a leecher peer 16; or a seeder and leecher peer at the same time. The peer-to-peer system 10 includes a tracker 18 for tracking content available on the different peers 12. The different peers 12 may receive and send information from each other and to and from the tracker 18 via one or more PCP (port control protocol) servers 20. In the example of FIG. 1, one of the seeder peers 14 (labeled 14-A and SEEDER-A) is connected via a PCP server 20-A in a mobile network to an SDN (software defined network) controller 22. Another one of the seeder peers 14 (labeled 14-B and SEEDER-B) is connected via a PCP proxy 24 to a PCP server 20-B at the Internet Service Provider (ISP) which in turn is connected to an SDN controller 26.

Each seeder peer 14 typically includes a processor 28 and a memory 30 to store data used by the processor 28. The processor 28 is operative to register (block 34) with a service to receive a plurality of upload bandwidth updates 32. The upload bandwidth updates 32 may also include other upload flow characteristic information updates, such as, upload packet loss and/or upload delay and/or upload jitter. The upload bandwidth updates 32 are typically provided by the service to the registered seeder peer 14 when there is a significant change in upload bandwidth of that seeder peer 14, for example when the network can no longer meet the upload bandwidth requested by the seeder peer 14 or when the network can again meet the required upload bandwidth. The definition of what is a significant change will be configurable. For example, a change of over 10 or 15% may be considered significant in some systems. By way of another example, if the network could accommodate 10 Mbps upstream bandwidth but later could only provide 3 Mbps then that change may be treated as a significant change. The upload bandwidth updates 32, subsequent to the first response from the service, are typically unsolicited, in that each of the upload bandwidth updates 32 are not individually requested by the registered seeder peers 14.

In a PPSP environment, registration with the service and receiving the upload bandwidth updates 32 may be implemented as follows. In the example of FIG. 1, the SDN controller 22 provides the upload bandwidth updates 32 for SEEDER-A via the PCP server 20-A and the SDN controller 26 provides the upload bandwidth updates 32 for SEEDER-B via the PCP server 20-B. As part of the registration process, the processor 28 may inform the service of the content bit-rate that the seeder peer 14 wants to serve to the leecher peers 16. The processor 28 may use a PCP MAP request with a FLOWDATA option (in accordance with PPSP) to determine the upstream flow characteristics that can be offered by the network. The PCP server 20 (the PCP server 20-A for SEEDER-A and the PCP server 20-B for SEEDER-B) signals the flow characteristics requested by the seeder peer 14 to the SDN controller (the SDN controller 22 for SEEDER-A and the SDN controller 26 for SEEDER-B). The SDN controller 22, 26 in-turn learns the available upstream flow characteristics that can be offered by on-path network devices (e.g. an evolved Node B in the mobile network). The SDN controller 22, 26 programs the network devices, for example, but not limited to, a serving gateway (SGW), a packet data network gateway (PDN-GW) and an evolved Node B to prioritize the flow between the peers 12 and informs the relevant PCP server 20 if the requested flow can be accommodated or not. The SDN controller 22, 26 learns of any change in the network conditions from the network devices and conveys updates in network conditions to the relevant PCP server 20 which in turn signals updated upstream flow characteristics including the upload bandwidth update 32 to the registered seeder peer 14.

The processor 28 of the seeder peer 14 is operative to receive the unsolicited upload bandwidth updates 32 from the service.

It should be noted that not all switches (not shown) and routers (not shown) in a large access network need to be PCP-aware. The PCP server 20 in the access network may convey the requested flow characteristics to the SDN controller 22, 26 using REST (block 36). Representational state transfer (REST) is an abstraction of the architecture of the World Wide Web; more precisely, REST is an architectural style consisting of a coordinated set of architectural constraints applied to components, connectors, and data elements, within a distributed hypermedia system. The SDN controller 22, 26 in turn installs appropriate quality of service rules against the flow on the on-path network devices using south bound application program interface (API). In SDN architecture, southbound APIs are used to communicate between the SDN Controller and the switches and routers of the network.

Figure 2:
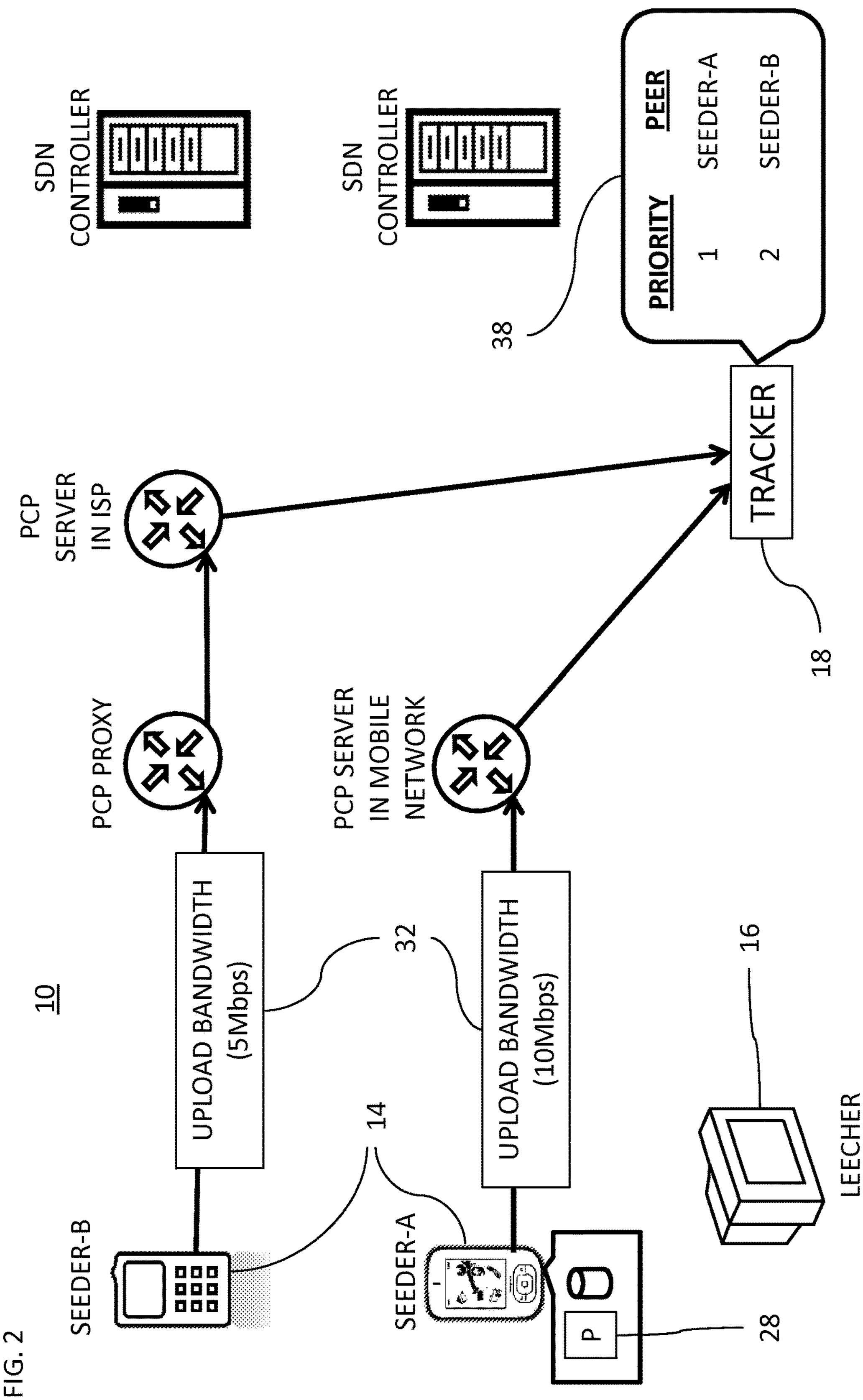
FIG. 2 is a partly pictorial, partly block diagram view of seeder peers updating a tracker in the peer-to-peer system of FIG. 1.

Reference is now made to FIG. 2, which is a partly pictorial, partly block diagram view of the seeder peers 14 updating the tracker 18 in the peer-to-peer system 10 of FIG. 1.

In response to receiving each upload bandwidth update 32, the processor 28 of each seeder peer 14 is operative to send the upload bandwidth update 32 to the peer-to-peer tracker 18 (for example, using PPSP Tracker Protocol). The peer-to-peer tracker 18 prepares a list 38 of the seeder peers 14 based on the upload bandwidth of each of the seeder peers 14 and optionally one or more other upload flow characteristics, for example, but not limited to, upload packet loss, upload delay and upload jitter. The list 38 may include, or be based on other information, received from the seeder peers 14, for example, but not limited to, geo-location of the seeder peer 14, reputation and online time. The list 38 may be sorted by the upload bandwidth of each of the seeder peers 14 and possibly weighted by one or more factors such as reputation and online time. The list 38 may include a priority value (e.g.: 1 being the highest priority). The list 38 may also include the upload bandwidth and possibly one or more factors such as geo-location of the seeder peer 14, reputation and online time to enable the leecher peers 16 (only one shown in the Figs.) to decide which of the seeder peers 14 should be selected for download based on the requirements of the leecher peers 16.

Additionally, the seeder peers 14 convey the identity/identities of the content they can serve to the tracker 18 (for example, using PPSP Tracker Protocol) so that leecher peers 16 can determine which of the seeder peers 14 include which content items (or part thereof).

Figure 3:
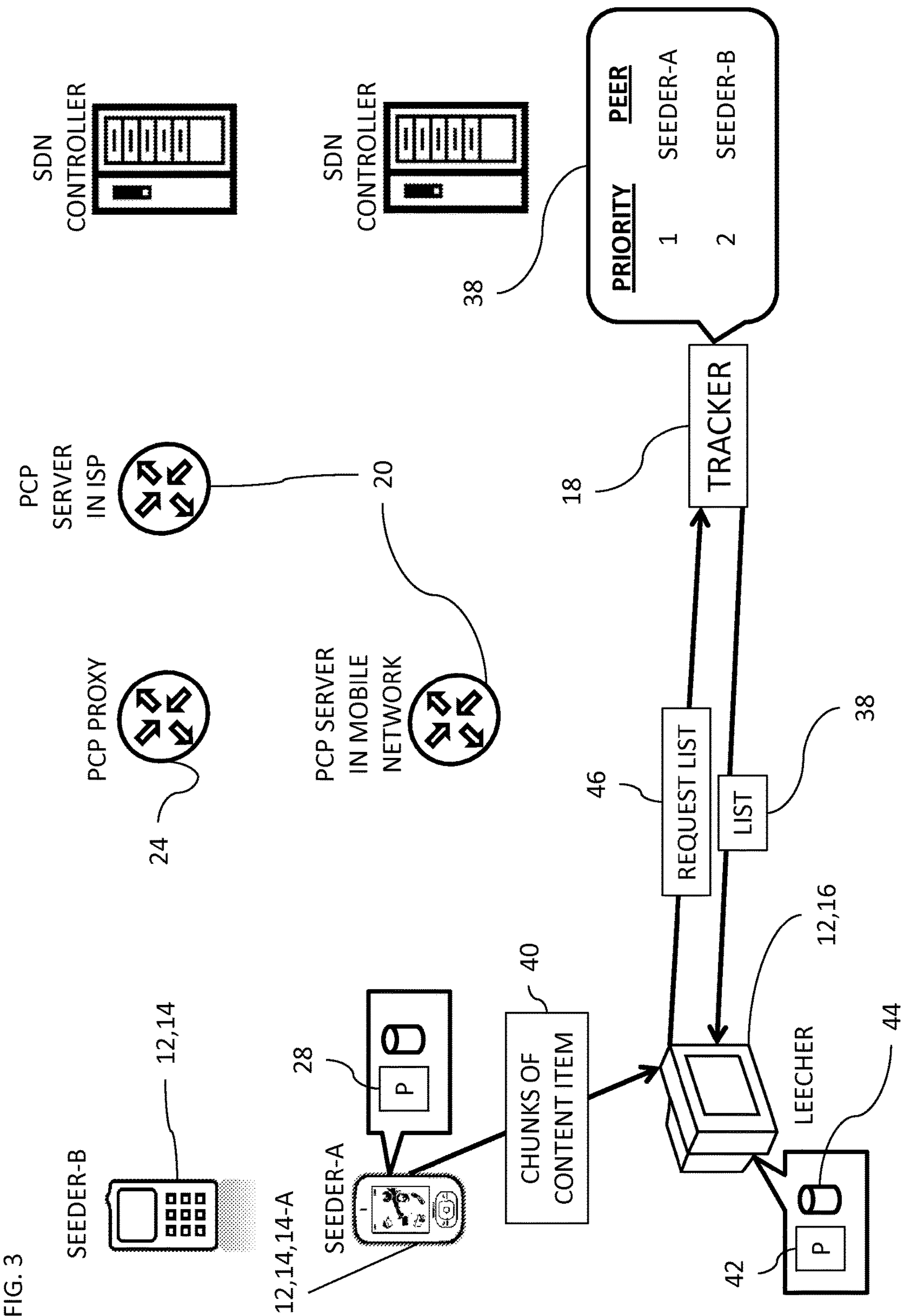
FIG. 3 is a partly pictorial, partly block diagram view of a leecher peer receiving a list from the tracker of FIG. 2 and downloading chunks of a content item from a seeder peer (SEEDER-A)

Reference is now made to FIG. 3, which is a partly pictorial, partly block diagram view of the leecher peer 16 receiving the list 38 from the tracker 18 of FIG. 2 and downloading chunks of a content item 40 from the seeder peer 14-A (SEEDER-A).

It should be noted that data transfer between the peers 12 and between the peers 12 and the tracker 18 may be via one or more of the PCP servers 20 and PCP proxy 24 as relevant. However, for the sake of simplicity, the data transfer in many cases is shown in the figures as occurring directly between the peers 12 and between the peers 12 and the tracker 18.

Each leecher peer 16 typically includes a processor 42 and a memory 44 to store data used by the processor 42.

The processor 42 is operative to connect to the tracker 18 and request (block 46) the list 38 of the seeder peers 14 from the peer-to-peer tracker 18.

The processor 42 is operative to receive the list 38 of the seeder peers 14 from the peer-to-peer tracker 18 and select one of the seeder peers 14 (seeder peer 14-A in the example of FIG. 3) from the list 38 of the seeder peers 14 from which to download at least part (chunks) of the content item 40.

The processor 42 is operative to select the seeder peer 14 with the highest priority in the list 38 or based on the highest upload bandwidth and optionally other factors such a geo-location, reputation and online time.

The processor 42 is operative to send a request to download at least part of the content item 40 from the selected seeder peer 14-A, SEEDER-A. The processor 28 of the seeder peer 14-A is operative to receive the request to download the content item 40 (or part thereof) from the leecher peer 16. In response to the request, the processor 28 of the seeder peer 14-A is operative to start sharing the content item 40 (or part thereof) with the leecher peer 16. The processor 42 of the leecher peer 16 is operative to start downloading at least part of the content item 40 from the selected seeder peer 14-A.

Figure 4:
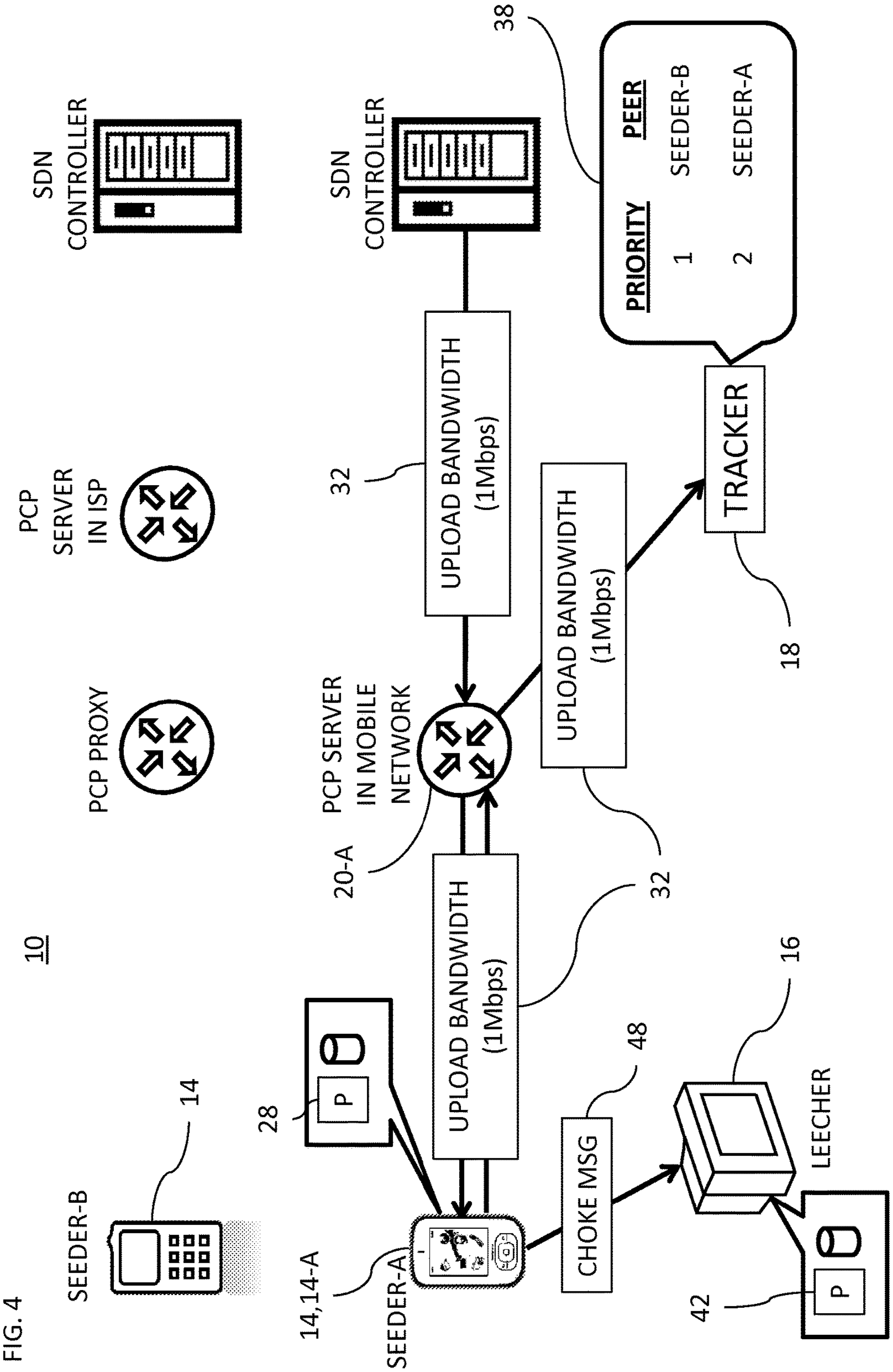
FIG. 4 is a partly pictorial, partly block diagram view showing processing by the peer-to-peer system of FIG. 1 following a deterioration in upload bandwidth of SEEDER-A.

Reference is now made to FIG. 4, which is a partly pictorial, partly block diagram view showing processing by the peer-to-peer system 10 of FIG. 1 following a deterioration in upload bandwidth of SEEDER-A.

If the network can no longer accommodate the flow characteristics requested by the seeder peer 14-A, then the seeder peer 14-A receives an unsolicited PCP response (the upload bandwidth update 32) from the PCP server 20-A and the seeder peer 14-A in-turn signals the updated flow characteristics (the upload bandwidth update 32) to the tracker 18. Tracker 18 updates the list 38 by decreasing the seeder peer 14-A priority in the peer list 38. The seeder peer 14-A typically also sends a message 48, for example a CHOKE message (see //tools.ietf.org/html/draft-ietf-ppsp-peer-protocol-10#section-3.9) to the leecher peer 16 downloading content from the seeder peer 14-A to stop the download. The leecher peer 16 could then initiate content download from one or more other seeder peers 14 listed in the updated list 38 prepared by the tracker 18.

The above is now described in more detail below.

The processor 28 of the seeder peer 14-A is operative to receive an (unsolicited) upload bandwidth update 32 indicating a deterioration in the upload bandwidth of the seeder peer 14-A.

The processor 28 of the seeder peer 14-A is operative, in response to receiving the upload bandwidth update 32 indicating the deterioration in the upload bandwidth of the seeder peer 14-A, to send the upload bandwidth update 32 to the peer-to-peer tracker 18 to update the list 38 of seeder peers 14 based on the upload bandwidth update 32 and to send the message 48 (e.g.: CHOKE message) to the leecher peer 16 indicating the deterioration in the upload bandwidth of the seeder peer 14-A.

The processor 42 of the leecher peer 16 is operative to receive the message 48 from the seeder peer 14-A indicating the deterioration in the upload bandwidth of the seeder peer 14-A.

Figure 5:
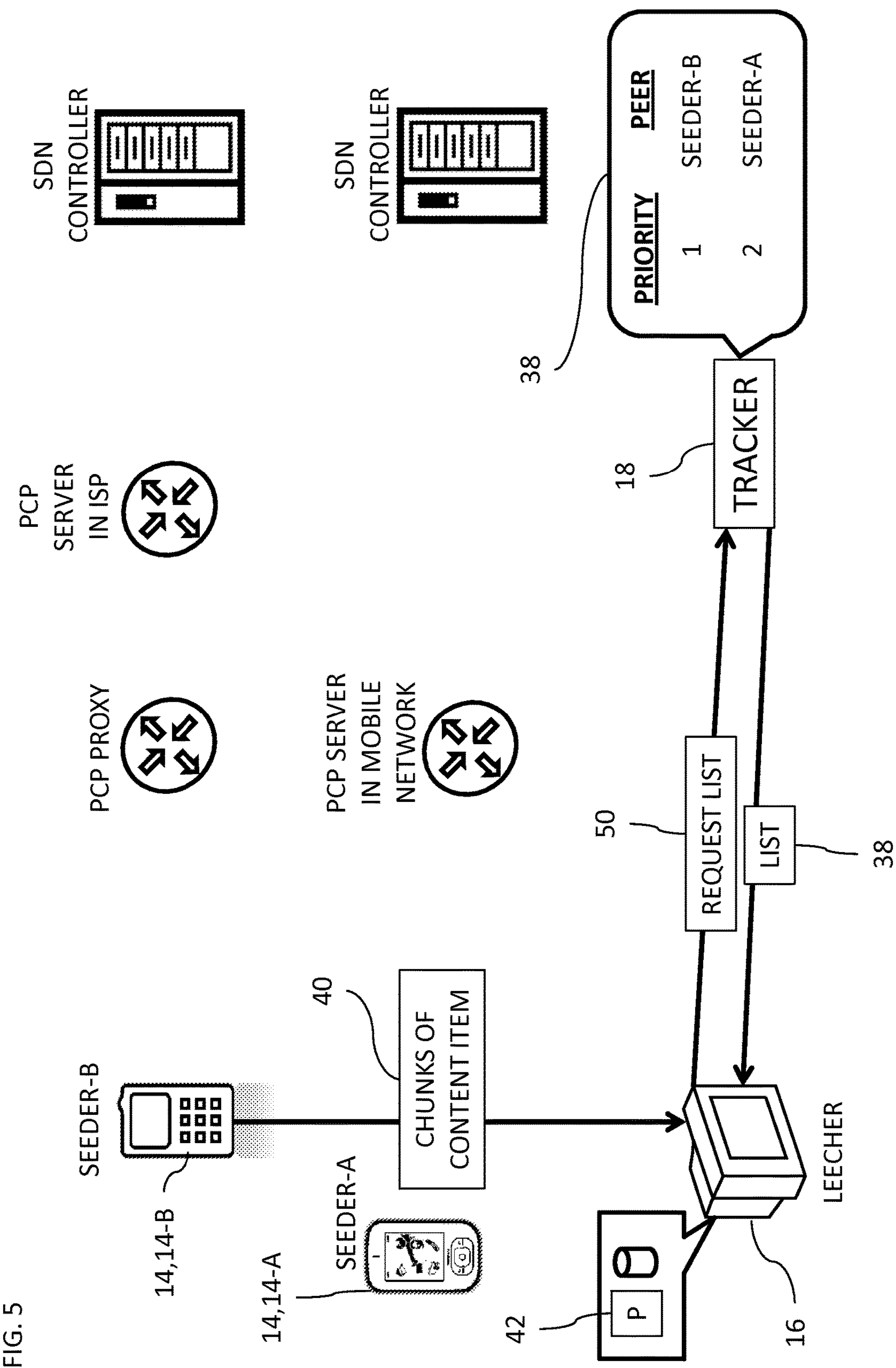
FIG. 5 is a partly pictorial, partly block diagram view of the leecher peer downloading chunks of the content item from a different seeder peer (SEEDER-B)

Reference is now made to FIG. 5, which is a partly pictorial, partly block diagram view of the leecher peer 16 downloading chunks of the content item 40 from a different seeder peer 14-B (SEEDER-B).

The processor 42 of the leecher peer 16 is operative to cease downloading the content item from the seeder peer 14-A. Similarly, the processor 28 of the seeder peer 14-A is operative to cease sharing the content item 40 with the leecher peer 16.

The processor 42 of the leecher peer 16 is operative, in response to receiving the message 48 (FIG. 4), to request (block 50) an update of the list 38 of the seeder peers 14 from the peer-to-peer tracker 18 and to receive the updated list 38 of the seeder peers 14 from the peer-to-peer tracker 18.

The processor 42 of the leecher peer 16 is operative to select the seeder peer 14-B from the updated list 38 from which to download some more chunks (another part) of the content item 40. The selection of the seeder peer 14-B is typically based on selecting the peer 14 with the highest priority in the updated list 38 or based on the highest upload bandwidth and optionally other factors such a geo-location, reputation and online time.

The processor 42 of the leecher peer 16 is operative to start downloading more chunks of the content item 40 from the seeder peer 14-B.

Figure 6:
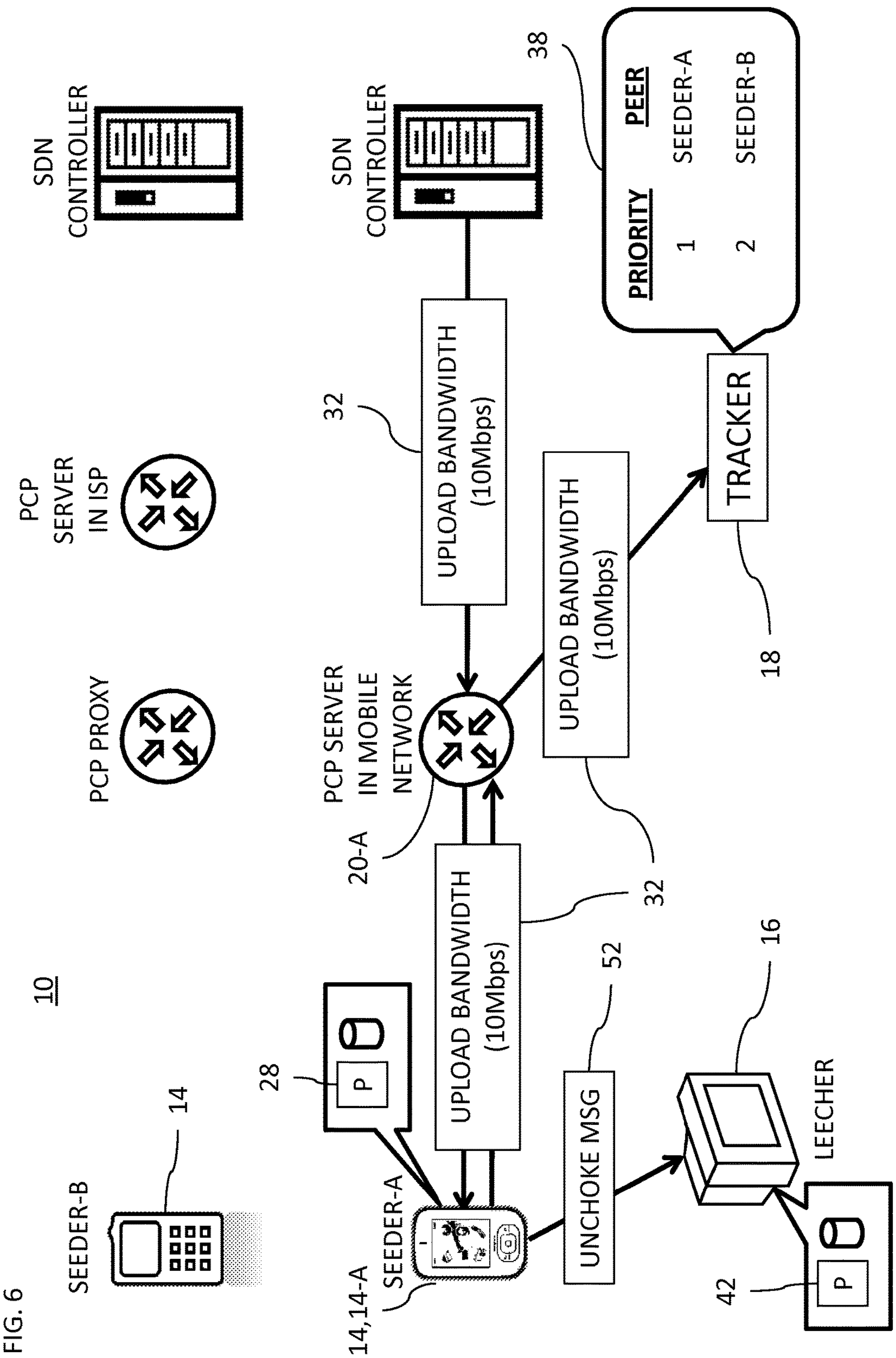
FIG. 6 is a partly pictorial, partly block diagram view showing processing by the peer-to-peer system of FIG. 1 following an improvement in upload bandwidth of SEEDER-A.

Reference is now made to FIG. 6, which is a partly pictorial, partly block diagram view showing processing by the peer-to-peer system 10 of FIG. 1 following an improvement in upload bandwidth of SEEDER-A.

If network conditions improve (for example to meet the flow characteristics requested by the seeder peer 14-A), then the PCP server 20-A sends an unsolicited PCP response with updated flow characteristics (the upload bandwidth update 32) to the seeder peer 14-A and the seeder peer 14-A in-turn signals the updated flow characteristics (the upload bandwidth update 32) to the tracker 18. The tracker 18 updates the list 38 by increasing the seeder priority in the peer list 38. The seeder peer 14-A may also send a message 52, for example an UNCHOKE message (see //tools.ietf.org/html/draft-ietf-ppsp-peer-protocol-10#section-3.9), to signal leecher peer(s) 16 that were communicating with the seeder peer 14-A previously that the seeder 14-A is ready to upload content again.

The above is now described in more detail below.

The processor 28 of the seeder peer 14-A is operative to receive , from the PCP server 20-A, an (unsolicited) upload bandwidth update 32 indicating an improvement in the upload bandwidth of the seeder peer 14-A since the previous upload bandwidth update 32.

The processor 28 of the seeder peer 14-A is operative, in response to receiving the latest upload bandwidth update 32 indicating the improvement in the upload bandwidth of the seeder peer 14-A, to send the latest upload bandwidth update 32 to the peer-to-peer tracker 18 to update the list 38 of the seeder peers 14 based on the latest upload bandwidth update 32 and to send the message 52 to the leecher peer 16 indicating the improvement in the upload bandwidth of the seeder peer 14-A.

The processor 42 of the leecher peer 16 is operative to receive the message 52 from the seeder peer 14-A indicating the improvement in the upload bandwidth of the seeder peer 14-A.

Figure 7:
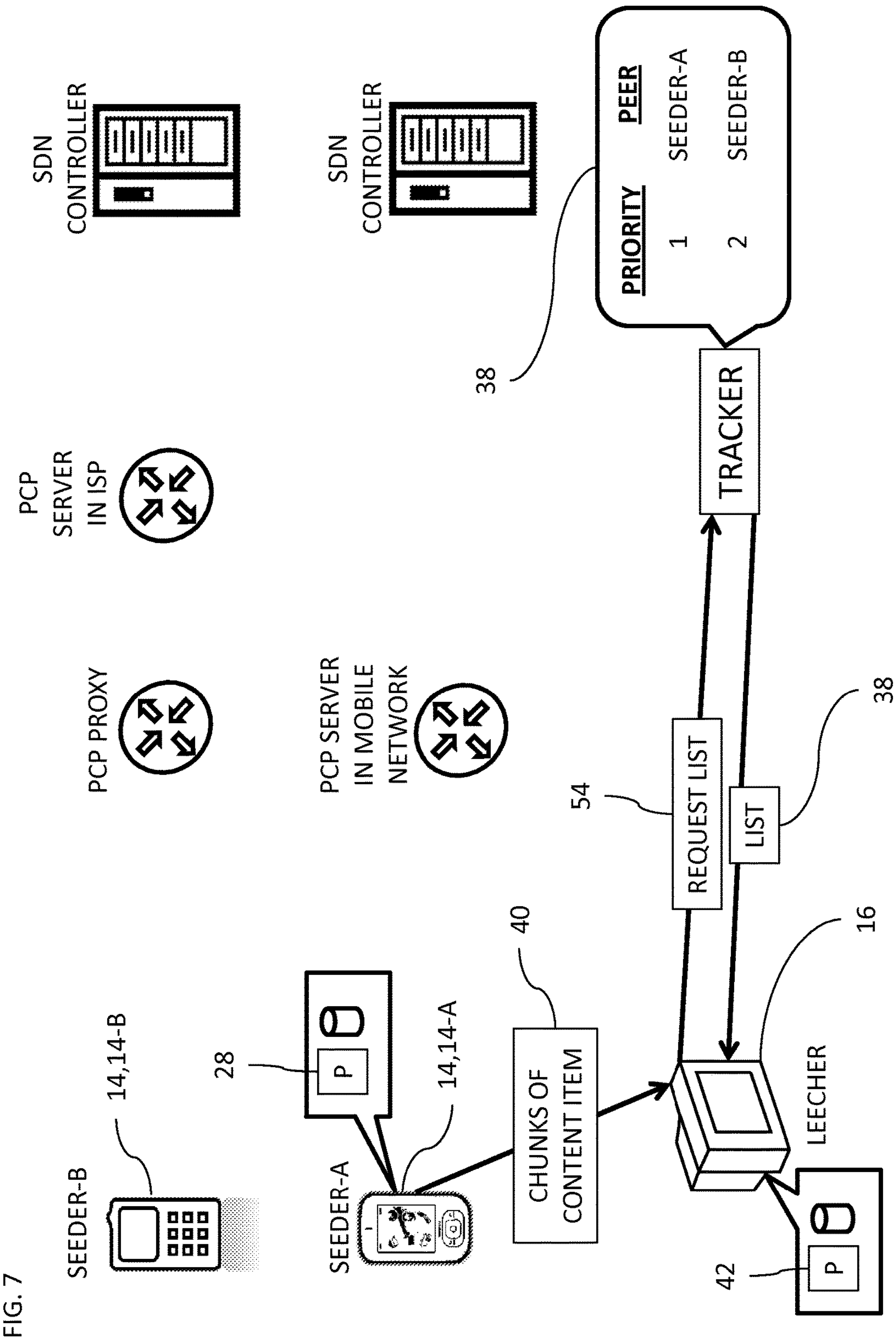
FIG. 7 is a partly pictorial, partly block diagram view of the leecher peer recommencing downloading chunks of the content item from SEEDER-A.

Reference is now made to FIG. 7, which is a partly pictorial, partly block diagram view of the leecher peer 16 recommencing downloading chunks of the content item 40 from SEEDER-A.

The processor 42 of the leecher peer 16, in response to receiving the message 52 (FIG. 6), is operative to request (block 54) a further updated list 38 of the seeder peers 14 from the peer-to-peer tracker 18 and receive the further updated list 38 of the seeder peers 14 from the peer-to-peer tracker 18.

Assuming the seeder peer 14-A has the highest priority and/or highest upload bandwidth or other favorable factors in the further updated list 38, the processor 42 is operative to re-select the seeder peer 14-A from which to download the portion of the content item 40 based on the further updated list 38.

Therefore, the processor 42 of the leecher peer 16 is operative, in response to receiving the message 52 (FIG. 6), to recommence downloading the content 40 from the seeder peer 14-A and optionally cease downloading the content item 40 from the seeder peer 14-B. Similarly, the processor 28 of the seeder peer 14-A is operative to recommence sharing the content item 40 with the leecher peer 16.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A device comprising:

a processor; and a memory to store data used by the processor, wherein the processor is operative to:

request a list of seeder peers from a peer-to-peer tracker;

receive the list of seeder peers from the peer-to-peer tracker, the list of seeder peers being based on an upload flow characteristic of each of seeder peers;

select a first seeder peer from the list of seeder peers from which to download at least part of a content item;

start downloading the at least part of the content item from the first seeder peer via one or more servers;

receive a first message from the first seeder peer during download of the at least part of the content item, the first message indicating a deterioration in the upload flow characteristic of the first seeder peer, wherein the processor being operative to receive the first message indicating the deterioration in the upload flow characteristics of the first seeder peer comprises the processor being operative to receive the first message indicating the deterioration in the upload flow characteristics of the first seeder peer in response to a change in an available upload bandwidth by a predetermined fraction;

in response to receiving the first message indicating the deterioration in the upload flow characteristic of the first seeder peer, request an updated list of seeder peers from the peer-to-peer tracker, the updated list of seeder peers being based on the upload flow characteristic of each of the seeder peers;

receive the updated list of seeder peers from the peer-to-peer tracker;

select a second seed peer from the updated list of seeder peers from which to download another part of the content item;

cease downloading the content item from the first seeder peer; and start downloading the other part of the content item from the second seeder peer.

2. The device according to claim 1, wherein the list of seeder peers is sorted by the upload flow characteristic.

3. The device according to claim 1, wherein the processor is operative to:

receive a second message from the first seeder peer indicating an improvement in the upload flow characteristic of the first seeder peer; and in response to receiving the second message, recommence downloading the content from the first seeder peer.

4. The device according to claim 3, wherein the processor is operative to:

in response to receiving the second message, request a further updated list of seeder peers from the peer-to-peer tracker;

receive the further updated list of seeder peers from the peer-to-peer tracker; and re-select the first seeder peer from the further updated list from which to recommence downloading the content item.

5. A device comprising:

a processor; and a memory to store data used by the processor, wherein the processor is operative to:

register with a service to receive a plurality of upload flow characteristic updates;

receive, at a seeder peer, the upload flow characteristic updates from the service;

send the upload flow characteristic updates to a peer-to-peer tracker which prepares a list of seeder peers based on the upload flow characteristic of seeder peers;

receive a request from a leecher peer to download at least part of a content item;

in response to receiving the request, start sharing the at least part of the content item with the leecher peer via one or more servers;

receive a first upload flow characteristic update, the first upload flow characteristic update indicating a deterioration in the upload flow characteristic of the seeder peer, wherein the processor being operative to receive the first message indicating the deterioration in the upload flow characteristics of the seeder peer comprises the processor being operative to receive the first message indicating the deterioration in the upload flow characteristics of the seeder peer in response to a change in an available upload bandwidth by a predetermined fraction;

in response to receiving the first upload flow characteristic update indicating the deterioration in the upload flow characteristic of the seeder peer, send a first message to the leecher peer during download of the at least part of the content item, the first message indicating the deterioration in the upload flow characteristic of the seeder peer; and cease sharing the content item with the leecher peer.

6. The device according to claim 5, wherein the processor is operative to send the first upload flow characteristic update to the peer-to-peer tracker to update the list of seeder peers based on the first upload flow characteristic update.

7. The device according to claim 5, wherein the processor is operative to:

receive a second upload flow characteristic update, the second upload flow characteristic update indicating an improvement in the upload flow characteristic of the seeder peer since the first upload flow characteristic update; and in response to receiving the second upload flow characteristic update indicating the improvement in the upload flow characteristic of the seeder peer, send a second message to the leecher peer indicating the improvement in the upload flow characteristic of the seeder peer.

8. The device according to claim 7, wherein the processor is operative send the second upload flow characteristic update to the peer-to-peer tracker to update the list of seeder peers based on the second upload flow characteristic update.

9. The device according to claim 7, wherein the processor is operative to recommence sharing the content item with the leecher peer.

10. A method comprising:

requesting a list of seeder peers from a peer-to-peer tracker;

receiving the list of seeder peers from the peer-to-peer tracker, the list of seeder peers being based on the upload flow characteristic of each of seeder peers;

selecting a first seeder peer of the seeder peers from the list of seeder peers from which to download at least part of a content item;

starting downloading the at least part of the content item from the first seeder peer via one or more servers;

receiving a first message from the first seeder peer during download of the at least part of the content item, the first message indicating a deterioration in the upload flow characteristic of the first seeder peer, wherein receiving the first message indicating the deterioration in the upload flow characteristics of the first seeder peer comprises receiving the first message indicating the deterioration in the upload flow characteristics of the first seeder peer in response to a change in an available upload bandwidth by a predetermined fraction;

in response to receiving the first message indicating a deterioration in the upload flow characteristic of the first seeder peer, requesting an updated list of seeder peers from the peer-to-peer tracker, the updated list of seeder peers being based on the upload flow characteristic of each of the seeder peers;

receiving the updated list of seeder peers from the peer-to-peer tracker;

selecting a second seeder peer of the seeder peers from the updated list of seeder peers from which to download another part of the content item;

ceasing downloading the content item from the first seeder peer; and starting downloading the other part of the content item from the second seeder peer.

11. The method according to claim 10, wherein the list of seeder peers is sorted by the upload flow characteristic.

12. The method according to claim 10, further comprising:

receiving a second message from the first seeder peer indicating an improvement in the upload flow characteristic of the first seeder peer; and in response to receiving the second message, recommence downloading the content from the first seeder peer.

13. The method according to claim 12, further comprising:

in response to receiving the second message, requesting a further updated list of seeder peers from the peer-to-peer tracker;

receiving the further updated list of seeder peers from the peer-to-peer tracker; and re-selecting the first seeder peer from the further updated list from which to recommence downloading the content item.

14. A method comprising:

registering with a service to receive a plurality of upload flow characteristic updates;

receiving the upload flow characteristic updates from the service;

sending the upload flow characteristic updates to a peer-to-peer tracker which prepares a list of seeder peers based on the upload flow characteristic of each of the seeder peers;

receiving a request from a leecher peer to download at least part of a content item;

in response to receiving the request, starting sharing the at least part of the content item with the leecher peer via one or more servers;

receiving a first one of the upload flow characteristic updates, the first upload flow characteristic update indicating a deterioration in the upload flow characteristic of the seeder peer, wherein receiving the first message indicating the deterioration in the upload flow characteristics of the first seeder peer comprises receiving the first message indicating the deterioration in the upload flow characteristics of the first seeder peer in response to a change in an available upload bandwidth by a predetermined fraction;

in response to receiving the first upload flow characteristic update indicating the deterioration in the upload flow characteristic of the seeder peer, sending a first message to the leecher peer during download of the at least part of the content item, the first message indicating the deterioration in the upload flow characteristic of the seeder peer; and ceasing sharing the content item with the leecher peer.

15. The method according to claim 14, further comprising sending the first upload flow characteristic update to the peer-to-peer tracker to update the list of seeder peers based on the first upload flow characteristic update.

16. The method according to claim 14, further comprising:

receiving a second one of the upload flow characteristic updates, the second upload flow characteristic update indicating an improvement in the upload flow characteristic of the seeder peer since the first upload flow characteristic update; and in response to receiving the second upload flow characteristic update indicating the improvement in the upload flow characteristic of the seeder peer, sending a second message to the leecher peer indicating the improvement in the upload flow characteristic of the seeder peer.

17. The method according to claim 16, further comprising sending the second upload flow characteristic update to the peer-to-peer tracker to update the list of seeder peers based on the second upload flow characteristic update.

18. The method according to claim 16, further comprising recommencing sharing the content item with the leecher peer.

19. The method of claim 10, wherein receiving the list of seeder peers from the peer-to-peer tracker comprises receiving the list of seeder peers from the peer-to-peer tracker, wherein the list of seeder peers is sorted by the available upload bandwidth of each of the seeder peers.

20. The method of claim 10, wherein receiving the list of seeder peers from the peer-to-peer tracker comprises receiving the list of the seeder peers from the peer-to-peer tracker, wherein the list of seeder peers comprises at least one of the following: a geolocation, a reputation, and online time of each of the seeder peers.

* * * * *